US006262564B1

(12) United States Patent
Kanamori

(10) Patent No.: US 6,262,564 B1
(45) Date of Patent: Jul. 17, 2001

(54) DRIVER FOR A CONTROLLABLE SWITCH IN A POWER CONVERTER

(75) Inventor: Takashi Kanamori, Carlsbad, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/710,318

(22) Filed: Nov. 10, 2000

(51) Int. Cl.$^7$ .................................................. G05F 1/613
(52) U.S. Cl. ......................... 323/224; 323/271; 323/289
(58) Field of Search ................................... 323/224, 271, 323/282, 289; 363/89, 127

(56) References Cited

U.S. PATENT DOCUMENTS 5,204,504 * 4/1993 Tanaka .................................. 323/289
5,621,604 * 4/1997 Carlson ................................ 323/271
6,175,218 * 1/2001 Choi et al. ............................. 363/89

* cited by examiner

*Primary Examiner*—Jeffrey Sterrett

(57) ABSTRACT

A driver for a controllable switch, a method of driving the controllable switch and a power converter employing the driver or the method. The driver receives a control signal and operates the controllable switch. In one embodiment, the driver includes a switching network coupled to the controllable switch and including first and second complementary drive switches. The driver also includes a capacitor coupled between control terminals of the first and second complementary drive switches, and a diode coupled between a bias energy source and the capacitor. The first and second complementary switches cooperate to produce a drive signal as a function of the control signal and a level of the bias energy source.

21 Claims, 5 Drawing Sheets

DRIVER FOR A CONTROLLABLE SWITCH IN A POWER CONVERTER

TECHNICAL FIELD OF THE INVENTION

The present invention is directed, in general, to power conversion and, more specifically, to a driver for a controllable switch and a power converter employing the same.

BACKGROUND OF THE INVENTION

A power converter is a power processing circuit that converts an input voltage waveform into a specified output voltage waveform. In many applications requiring a DC output, switched-mode DC—DC converters are frequently employed to advantage. DC—DC converters generally include an inverter, a transformer having a primary winding coupled to the inverter and a rectifier coupled to a secondary winding of the transformer. The inverter generally includes a switching device, such as a field-effect transistor (FET), that converts the DC input voltage to an AC voltage. The transformer then transforms the AC voltage to another value and the rectifier generates the desired DC voltage at the output of the DC—DC converter.

Conventionally, the rectifier includes passive rectifying devices, such as Schottky diodes, that conduct the load current only when forward-biased in response to the input waveform to the rectifier. Passive rectifying devices, however, generally cannot achieve forward voltage drops of less than about 0.35 volts, thereby substantially limiting a conversion efficiency of the DC—DC converter. To achieve an acceptable level of efficiency, DC—DC converters that provide low output voltages (e.g., 1 volt) often require rectifying devices that have forward voltage drops of less than about 0.1 volts. The DC—DC converters, therefore, generally use synchronous rectifiers. A synchronous rectifier replaces the passive rectifying devices of the conventional rectifier with rectifier switches, such as FETs or other controllable switches, that are periodically driven into conduction and non-conduction modes in synchronism with the periodic waveform of the AC voltage. The rectifier switches exhibit resistive-conductive properties and may thereby avoid the higher forward voltage drops inherent in the passive rectifying devices.

One difficulty with using a rectifier switch (e.g., an n-channel silicon FET) is the need to provide a drive signal that alternates between a positive voltage to drive the device into the conduction mode and a zero or negative voltage to drive the device into the non-conduction mode. Of course, depending on the type of rectifier switch, an opposite drive polarity may be employed. Although a capacitive charge within the rectifier switch may only be 30 to 50 nanocoulombs per device (rectifier switch), in situations where as many as a dozen or more devices may be used, a high drive current may be required for a brief period of time to change conduction modes.

Additionally, rectifier switches may require larger voltages than are available from logic circuits, which is typically a maximum of 5 volts, to drive the rectifier switch into the conduction mode. Conventionally, level shifting chips or integrated circuit drivers may be used to solve the problem. However, they typically offer less than an optimal solution since they provide additional product cost and usually cause switching or signal delays that negatively impact the onset of the conduction mode. Additionally, the maximum value of the level shifting voltage may not be satisfactory for some rectifier applications.

Accordingly, what is needed in the art is a driver that minimizes switching delays and provides a broader range of drive signal voltages.

SUMMARY OF THE INVENTION

To address the above-discussed deficiencies of the prior art, the present invention provides a driver for a controllable switch, a method of driving the controllable switch and a power converter employing the driver or the method. The driver receives a control signal and operates the controllable switch. In one embodiment, the driver includes a switching network coupled to the controllable switch and including first and second complementary drive switches. The driver also includes a capacitor coupled between control terminals of the first and second complementary drive switches and a diode coupled between a bias energy source and the capacitor. The first and second complementary switches cooperate to produce a drive signal as a function of the control signal and a level of the bias energy source.

The present invention introduces, in one aspect, the capability to tailor a value of a drive signal to operate a controllable switch without sacrificing switching response time through switching delays. A plurality of controllable switches may be controlled from a single drive signal employing a single bias energy source. Alternatively, a plurality of bias energy sources may be employed in association with a collection of drivers to accommodate a collection of controllable switches having a spectrum of operating requirements.

In one embodiment of the present invention, a peak of the drive signal is substantially equal to the level of the bias energy source. Of course, the driver may also be appropriately configured to provide a peak of the drive signal that is different than the bias energy source.

In one embodiment of the present invention, the controllable switch is a metal-oxide semiconductor field effect transistor (MOSFET). In a related, but alternative embodiment, the first and second complementary switches are embodied in a complementary metal-oxide semiconductor (CMOS) device.

In one embodiment of the present invention, an input of the driver is coupled to an inverter. Of course, in an alternative embodiment, the input of the driver may accommodate a control signal that does not require an inverter.

In one embodiment of the present invention, the driver further includes a resistor interposed between the diode and the capacitor. Alternatively, the resistor may be interposed between the diode and the bias energy source. In a related, but alternative embodiment of the present invention, the driver further includes a filter capacitor coupled to the bias energy source.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
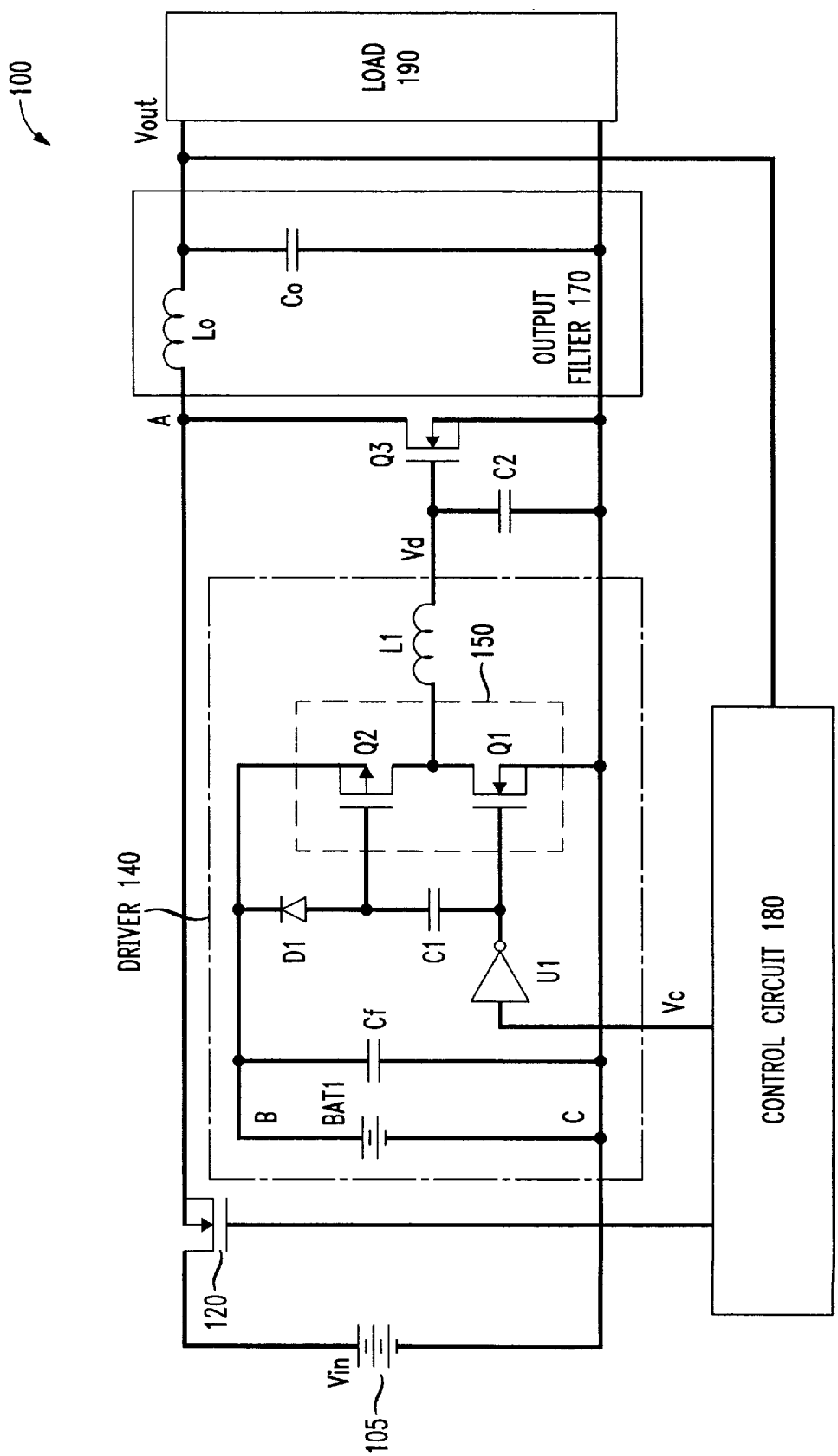
FIG. 1 illustrates a schematic diagram of an embodiment of a power converter constructed according to the principles of the present invention.

Referring initially to FIG. 1, illustrated is a schematic diagram of an embodiment of a power converter 100 constructed according to the principles of the present invention. The power converter 100 has an input couplable to a source of electrical power 105 having an input voltage Vin and an output that provides an output voltage Vout to a load 190. The power converter 100 includes a power switch 120 coupled to the input. In the illustrated embodiment, the power switch 120 is a metal oxide semiconductor field-effect transistor (MOSFET). Of course, other controllable switches, such as bipolar junction transistors (BJTs) and gallium arsenide field-effect transistors (GaAsFETs) are well within the broad scope of the present invention.

The power converter 100 further includes an output filter 170, having an output filter inductor Lo and an output filter capacitor Co, coupled to the output. The power converter 100 further includes a synchronous rectifier coupled to a node A between the power switch 120 and the output filter inductor Lo. In the illustrated embodiment, the synchronous rectifier includes a controllable switch Q3. While the illustrated controllable switch Q3 is an n-channel metal oxide semiconductor field-effect transistor (MOSFET), other controllable switches, such as bipolar junction transistors (BJTS) and gallium arsenide field-effect transistors (GaAsFETs), are well within the broad scope of the present invention. The controllable switch Q3 has an intrinsic input capacitance therein, explicitly represented in FIG. 1 by an intrinsic capacitor C2 coupled to a control terminal of the controllable switch Q3. Of course, the synchronous rectifier may include any number of controllable switches as may be required by a particular application.

The power converter 100 further includes a driver 140 that generates and delivers a drive signal Vd to drive the control terminal of the controllable switch Q3. The power converter 100 still further includes a control circuit 180 coupled to the power switch 120 and the driver 140. The control circuit 180 monitors the output voltage Vout and adjusts the duty cycle of the power switch 120 to regulate the output voltage Vout despite variations in the input voltage Vin or the load 190. Of course, the control circuit 180 may monitor other control points within the power converter 100 as desired.

The driver 140 includes a bias energy source that, in the illustrated embodiment, is a battery BAT1. Of course, other types of energy sources, such as a typical internal bias supply or an external bias supply, are well within the broad scope of the present invention. The bias energy source BAT1 includes an optional filter capacitor Cf coupled thereacross. The filter capacitor Cf may be employed to store a portion of the energy supplied by the bias energy source BAT1. The filter capacitor Cf is preferably sufficiently large such that it is capable of acquiring a nominally constant voltage throughout the resonant operational cycles of the driver 140 and the controllable switch Q3.

The drive circuit 140 further includes a switching network 150 having series-coupled first and second complementary drive switches Q1, Q2 coupled to a first terminal B of the bias energy source BAT1. The drive circuit 140 further includes an inductor L1 coupled to the controllable switch Q3. The drive circuit 140 still further includes an inverter U1, a capacitor C1 and a diode D1. The second complementary drive switch Q2 is configured to resonantly transfer energy from the bias energy source BAT1 to the control terminal of the controllable switch Q3 via the inductor L1 to close the controllable switch Q3. The first complementary drive switch Q1 is configured to resonantly discharge the energy through the control terminal of the controllable switch Q3 to open it. While the first and second complementary drive switches Q1, Q2 are illustrated as complementary metal-oxide semiconductor (CMOS) field effect transistors, other controllable switches, such as bipolar junction transistors (BJTs) and gallium arsenide field-effect transistors (GaAsFETs), are well within the broad scope of the present invention.

The power converter 100 operates as follows. During a first interval, when the power switch 120 is ON (conducting), the source of electric power 105 provides energy to the load 190 as well as to the output filter inductor Lo. Then, during a second interval when the power switch 120 is OFF (non-conducting), the inductor current flows through the controllable switch Q3, transferring at least a portion of its stored energy to the load 190.

The controllable switch Q3 may have a substantial intrinsic capacitance (represented by the intrinsic capacitor C2). The amount of energy that is stored in the intrinsic capacitor C2 each switching cycle (as the controllable switch Q3 is turned ON and OFF) is related to the conduction losses experienced by the controllable switch Q3. To increase the efficiency of the power converter 100, a substantial portion of the energy stored in the intrinsic capacitor C2 should be recovered each switching cycle. Further, the closing and opening of the controllable switch Q3 should be synchronized with the operation of the power switch 120.

By employing a resonance between the inductor L1 and the intrinsic capacitor C2, the transfer of energy to and from the controllable switch Q3 may be accomplished in a substantially lossless manner.

Figure 2:
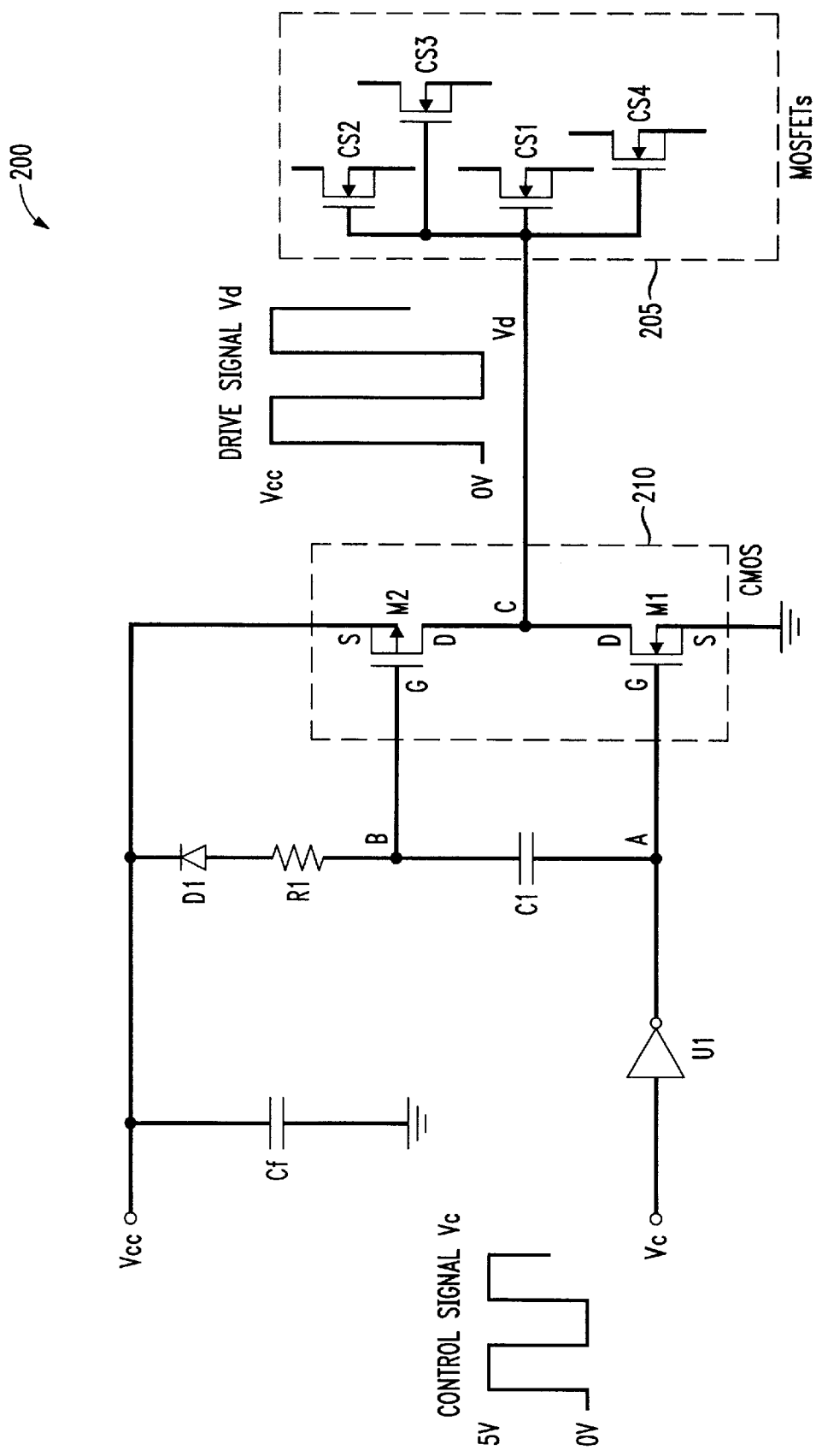
Fig. 2 illustrates a schematic diagram of an embodiment of a driver constructed according to the principles of the present invention.

Turning now to FIG. 2, illustrated is a schematic diagram of an embodiment of a driver 200 constructed according to the principles of the present invention. The driver 200 is connected to a bias energy source Vcc and accepts a control signal Vc to provide a drive signal Vd to a plurality of controllable switches (collectively designated 205). The controllable switches 205 include first, second, third and fourth MOSFETs CS1, CS2, CS3, CS4. The driver 200 includes a complementary metal-oxide semiconductor device (CMOS) 210, which forms a switching network 210, having first and second complementary drive switches M1, M2. The driver 200 further includes an inverter U1, a capacitor C1, a diode D1, a resistor R1 and a filter capacitor $C_f$, which is coupled to the bias energy source Vcc.

The driver 200 receives the control signal Vc, which switches between zero and five volts in the illustrated embodiment, and operates each of the plurality of controllable switches 205. The input of the driver 200 is coupled to the inverter U1. Of course, in an alternative embodiment, the input of the driver 200 may accommodate a control signal Vc that does not require the inverter U1. The capacitor C1 is coupled between first and second control terminals A, B of the first and second complementary drive switches M1, M2 respectively. The capacitor C1 effectively transfers the output signal of the driver U1 to the second control terminal B. This action allows the first and second complementary switches M1, M2 to rapidly cooperate to produce the drive signal Vd at an output terminal C as a function of the control signal Vc and a level of the bias energy source Vcc.

The diode D1 is coupled between the bias energy source Vcc and the capacitor C1. The diode D1 performs as a clamping device to restrain the voltage on the second control terminal B if it attempts to rise above the level of the bias energy source Vcc. Additionally, the resistor R1 is coupled between the capacitor C1 and the diode D1, in the illustrated embodiment, to limit a peak current through the diode D1 during a clamping interval. Alternatively, the resistor R1 may be coupled between the diode D1 and the bias energy source Vcc.

In the illustrated embodiment, a peak of the drive signal Vd is substantially equal to the level of the bias energy source Vcc. of course, the driver 200 may also be appropriately configured to provide a peak of the drive signal Vd that is less than the bias energy source Vcc. Inclusion of an additional resistor R1 that is series coupled between the source of the second complementary drive switch M2 and the bias energy source Vcc reduces the peak of the drive signal Vd below the level of the bias energy source Vcc. Alternatively, the bias energy source Vcc may be continuously or step-wise selectable as an application may dictate.

Additionally, a resistor may be added between output terminal C and the controllable switches 205 to adjust the timing of opening and closing thereof. The driver 200, however, operates under the same principle.

Figure 3:
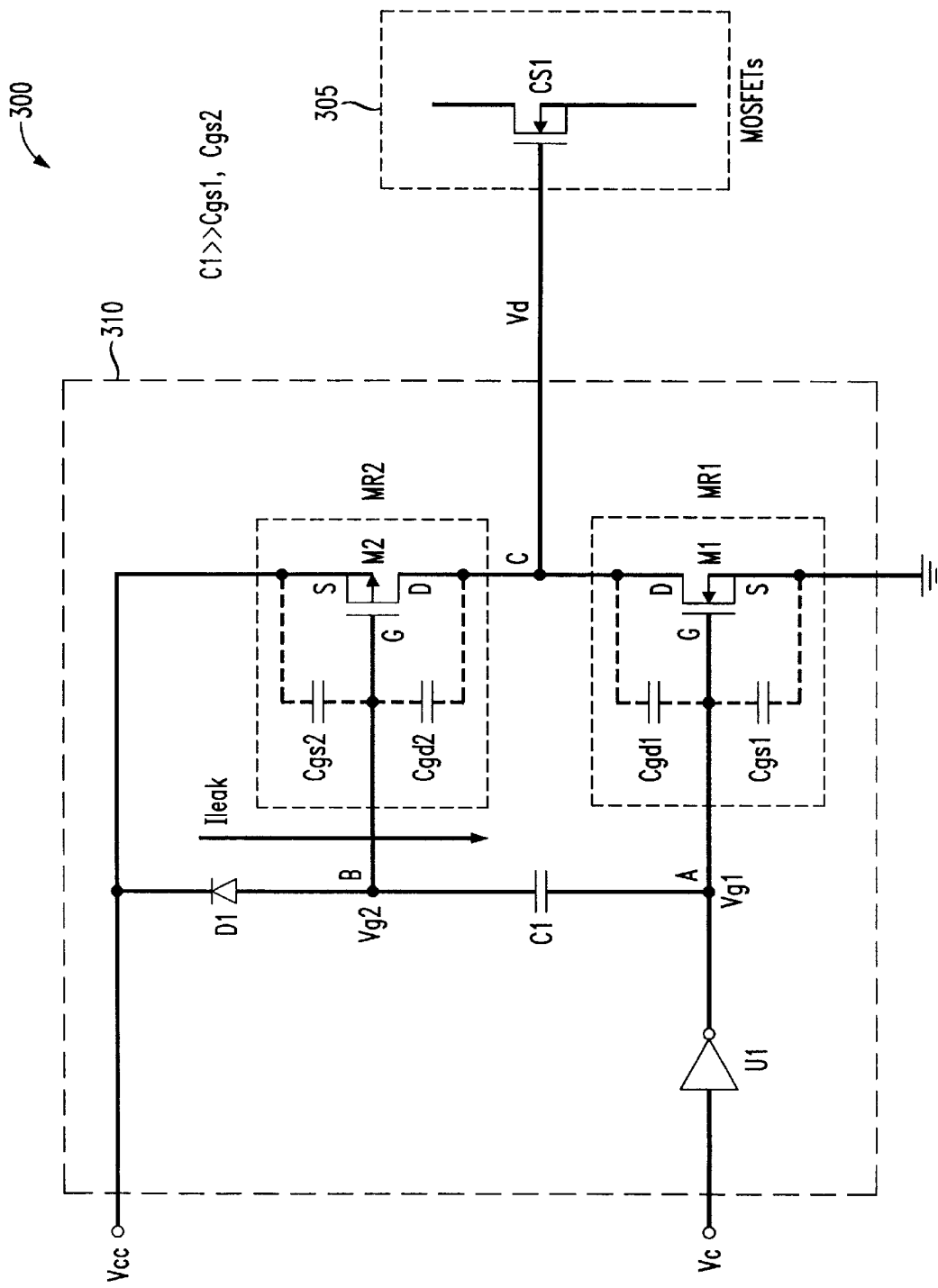
FIG. 3 illustrates a schematic diagram of a representative circuit of the driver of FIG. 2.

Turning now to FIG. 3, illustrated is a schematic diagram 300 of a representative circuit 310 of the driver 200 of FIG. 2. The representative circuit 310 may be used to analyze the operation of the driver 200 for an initial condition wherein the drive signal Vd maintains a controllable switch 305 in an open or nonconducting state. The representative circuit 310 includes first and second CMOS representations MR1, MR2 of the first and second complementary drive switches M1, M2. The representative circuit 310 also includes an inverter U1, a capacitor C1 and a diode D1. Additionally, the first and second CMOS representations MR1, MR2 include first and second gate-to-source capacitances Cgs1, Cgs2 and first and second gate-to-drain capacitances Cgd1, Cgd2, respectively.

The first and second gate-to-drain capacitances Cgd1, Cgd2 are series coupled, and their resultant combination capacitance is parallel coupled with the capacitor C1. In the illustrated embodiment, the capacitor C1 has a value of capacitance that is much greater than this resultant combination capacitance thereby allowing the effect of the first and second gate-to-drain capacitances Cgd1, Cgd2 to be negligible.

A control signal Vc is maintained at a value of zero volts thereby providing a value of 5 volts from the inverter U1 as a first gate voltage Vg1 at a terminal A for the first CMOS representation MR1. The diode D1 has a small reverse leakage current Ileak, as shown in FIG. 3. The reverse leakage current Ileak charges the capacitor C1 until a second gate voltage Vg2 at terminal B for the second CMOS representation MR2 substantially equals the value of a bias energy source Vcc. This produces a capacitor voltage (Vg2–Vg1) across the capacitor C1 that has a value of (Vcc–5) volts. This action closes the first complementary drive switch M1 and opens the second complementary drive switch M2. For this condition, a drive signal Vd provides a value of zero volts thereby maintaining the controllable switch 305 in an open or nonconducting state.

Figure 4:
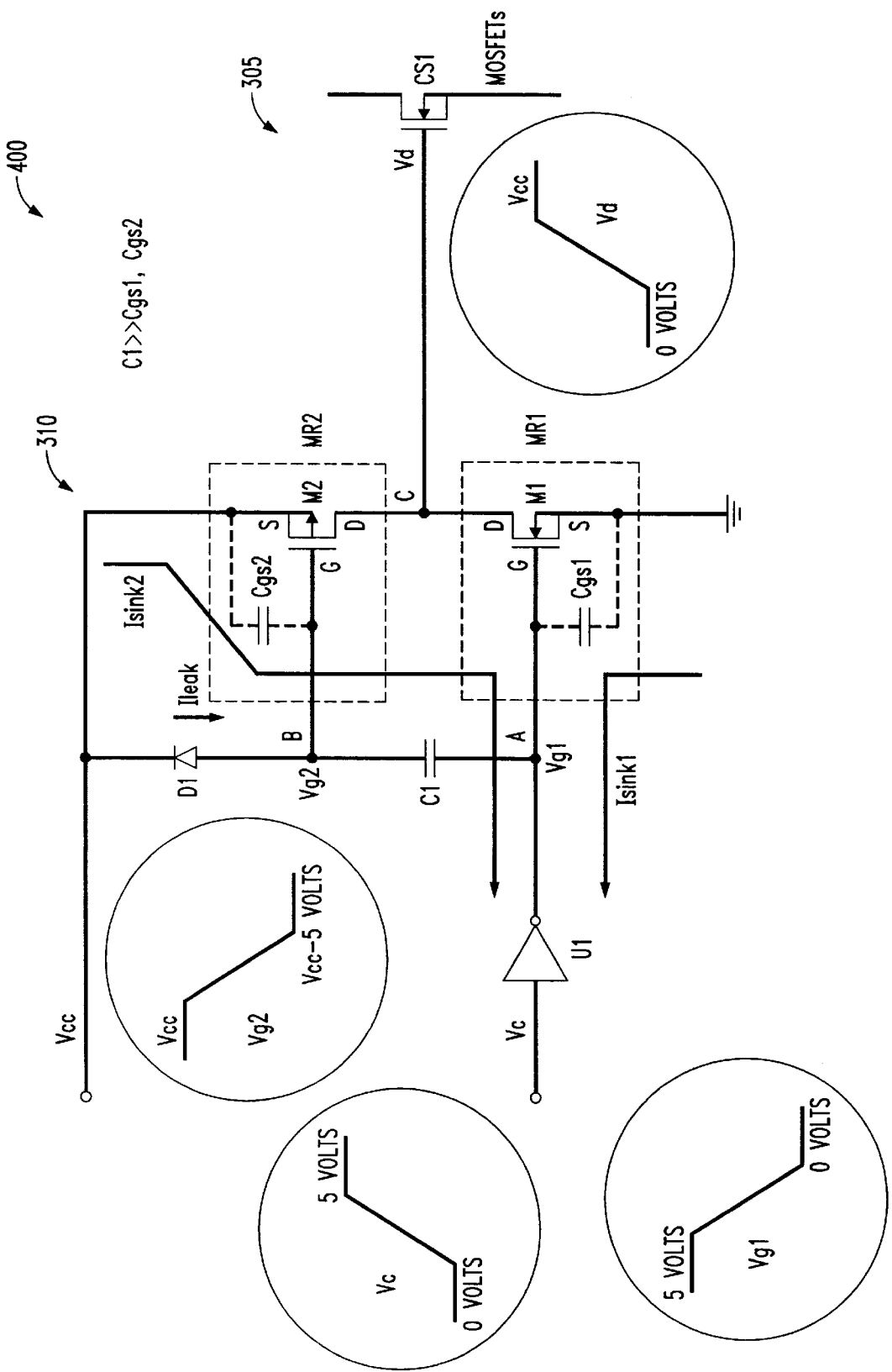
FIG. 4 illustrates a schematic diagram showing a suite of switching parameters associated with the representative circuit for closing the controllable switch shown in FIG. 3.

Turning now to FIG. 4, illustrated is the schematic diagram showing a suite of switching parameters 400 associated with the representative circuit 310 for closing the controllable switch 305 shown in FIG. 3. The suite of switching parameters 400 includes a control signal Vc, a first gate voltage Vg1, a second gate voltage Vg2, a drive signal Vd and first and second sink currents Isink1, Isink2.

As the control signal Vc switches from zero volts to 5 volts, the potential of the first gate voltage Vg1 switches from 5 volts to zero volts. This action allows the output of the inverter U1 to accept the first sink current Isink1 and thereby discharge the first gate-to-source capacitance Cgs1. At the same time, the second gate voltage Vg2 switches from a value essentially equal to the bias energy source Vcc to a value of (Vcc–5) volts. This action also allows the output of the inverter U1 to accept the second sink current Isink2 and thereby charge the second gate-to-source capacitance Cgs2.

During shorter switching periods, the voltage across the capacitor C1 remains essentially constant at a value near (Vcc–5) volts since the values of the first and second sink currents Isink1, Isink2 and the reverse leakage current Ileak are too small to appreciably change this voltage. This situation provides for a rapid transition of the drive signal Vd from zero volts to Vcc volts thereby closing the controllable switch 305.

Figure 5:
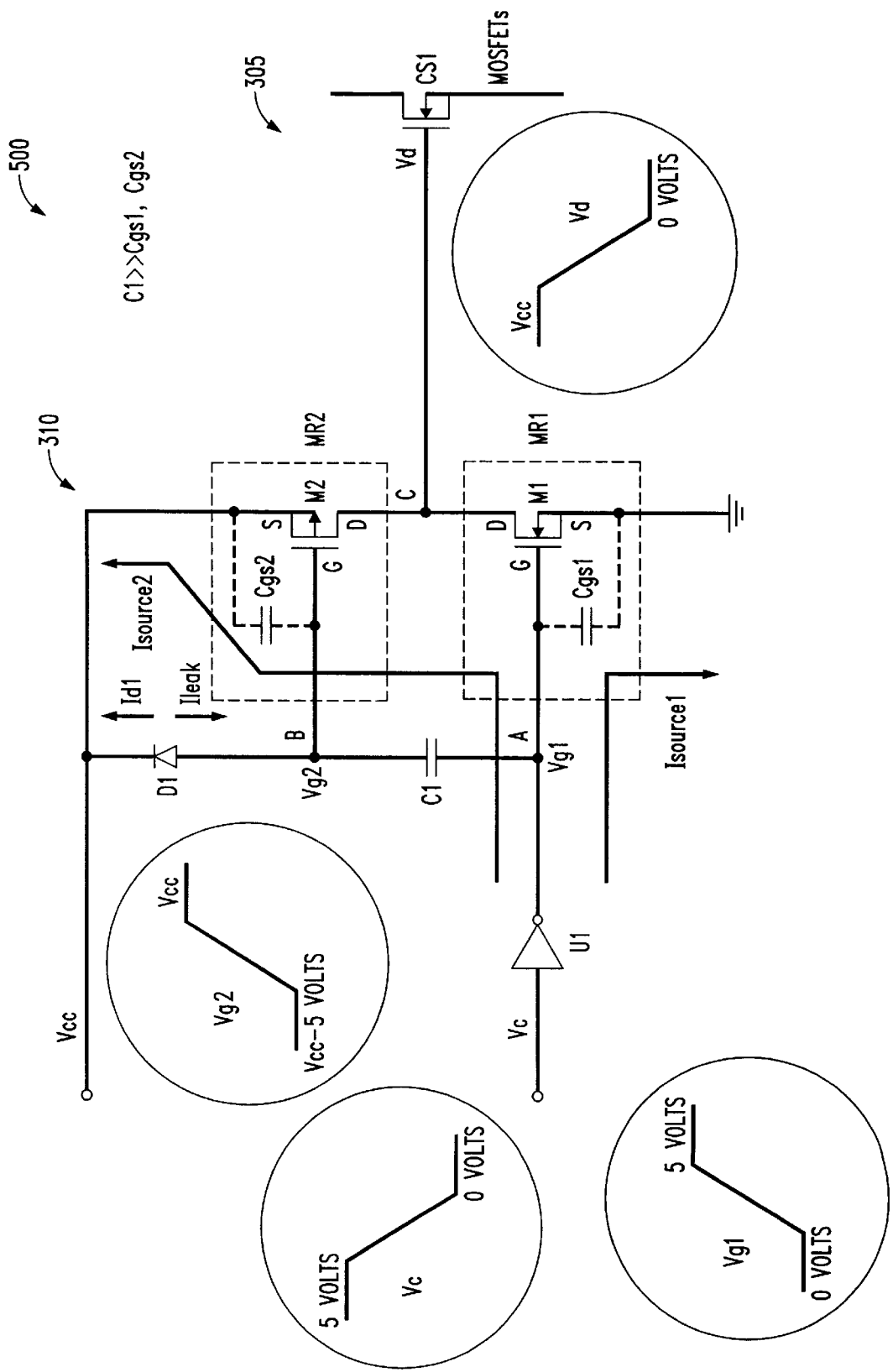
FIG. 5 illustrates a schematic diagram showing a suite of switching parameters associated with the representative circuit for opening the controllable switch shown in FIG. 3.

Turning now to FIG. 5, illustrated is the schematic diagram showing a suite of switching parameters 500 associated with the representative circuit 310 for opening the controllable switch 305 shown in FIG. 3. The suite of switching parameters 500 includes a control signal Vc, a first gate voltage Vg1, a second gate voltage Vg2, a drive signal Vd and first and second source currents Isource1, Isource2.

As the control signal Vc switches from 5 volts to zero volts, the potential of the first gate voltage Vg1 switches from zero volts to 5 volts. This action allows the output of the inverter U1 to provide the first source current Isource1 and thereby charge the first gate-to-source capacitance Cgs1. At the same time, the second gate voltage Vg2 switches from a value of (Vcc–5) volts to a value essentially equal to the bias energy source Vcc. This action also allows the output of the inverter U1 to provide the second sink current Isource2 and thereby discharge the second gate-to-source capacitance Cgs2.

During shorter switching periods, the voltage across the capacitor C1 again remains essentially constant at a value near (Vcc–5) volts since the values of the first and second source currents Isource1, Isource2 and the reverse leakage current Ileak are too small to appreciably change this voltage. This situation provides for a rapid transition of the drive signal Vd from Vcc volts to zero volts thereby opening the controllable switch 305.

For extended switching periods, the reverse leakage current Ileak causes the second gate voltage Vg2 to increase toward the bias energy source Vcc as the charge across the capacitor C1 increases. This increase in the second gate voltage Vg2 will cause the diode D1 to be forward biased when the control signal Vc switches from 5 volts to zero volts as shown in FIG. 5. Forward biasing the diode D1 allows a forward bias current Id1 to flow into the bias energy source Vcc thereby clamping the second gate voltage Vg2 to a maximum value substantially equal to the bias energy source Vcc.

In summary, the present invention introduces, in one aspect, the capability to tailor a value of a drive signal needed to fully operate a controllable switch without sacrificing switching response time through inordinate switching delays. A plurality of controllable switches may be controlled from a single drive signal employing a single bias energy source. Alternatively, a plurality of bias energy sources may be employed in a collection of drivers to accommodate a collection of controllable switches having a spectrum of operating requirements.

Those skilled in the art should understand that the previously described embodiments of the power converter and driver are submitted for illustrative purposes only and other embodiments are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa.

The principles of the present invention may be applied to a wide variety of power circuit topologies. Additionally, the driver of the present invention may be used with various half bridge, full bridge, flyback, buck-boost, CUK, and boost converter topologies employing discrete or integrated magnetics. For a better understanding of a variety of power converter topologies employing discrete and integrated magnetic techniques, see, *Modern DC-to-DC Switchmode Power Converter Circuits*, by Rudolph P. Severns and Gordon Bloom, Van Nostrand Reinhold Company, New York, N.Y. (1985), which is incorporated herein by reference in its entirety.

Although the present invention has been described in detail, those skilled in the art should understand that they can make various changes, substitutions and alterations herein without departing from the spirit and scope of the invention in its broadest form.

What is claimed is:

1. A driver configured to receive a control signal and operate a controllable switch, comprising:
    a switching network couplable to said controllable switch and including first and second complementary drive switches;
    a capacitor coupled between control terminals of said first and second complementary drive switches; and
    a diode couplable between a bias energy source and said capacitor, said first and second complementary switches configured to cooperate to produce a drive signal as a function of said control signal and a level of said bias energy source.

2. The driver as recited in claim 1 wherein a peak of said drive signal is substantially equal to said level of said bias energy source.

3. The driver as recited in claim 1 wherein said controllable switch is a metal-oxide semiconductor field effect transistor (MOSFET).

4. The driver as recited in claim 1 wherein said first and second complementary switches are embodied in a complementary metal-oxide semiconductor (CMOS) device.

5. The driver as recited in claim 1 wherein an input of said driver is coupled to an inverter.

6. The driver as recited in claim 1 further comprising a resistor interposed between said diode and said capacitor.

7. The driver as recited in claim 1 further comprising a filter capacitor couplable to said bias energy source.

8. A method of operating a controllable switch, comprising:
    providing a switching network coupled to said controllable switch and including first and second complementary drive switches;
    maintaining a voltage differential between said first and second complementary drive switches;
    selectively blocking a current from a bias energy source to maintain said voltage differential; and
    controlling said first and second complementary switches to produce a drive signal as a function of a control signal and a level of said bias energy source.

9. The method as recited in claim 8 wherein a peak of said drive signal is substantially equal to said level of said bias energy source.

10. The method as recited in claim 8 wherein said controllable switch is a metal-oxide semiconductor field effect transistor (MOSFET).

11. The method as recited in claim 8 wherein said first and second complementary switches are embodied in a complementary metal-oxide semiconductor (CMOS) device.

12. The method as recited in claim 8 wherein said control signal is inverted.

13. The method as recited in claim 8 wherein said maintaining is performed by capacitor.

14. The method as recited in claim 8 wherein said selectively blocking is performed by a diode.

15. A power converter, comprising:
    a power switch,
    a synchronous rectifier coupled to said power switch and having a rectifier switch; and
    a driver that receives a control signal and operates at least one of said power switch and said rectifier switch, including:
        a switching network coupled to said at least one of said power switch and said rectifier switch and including first and second complementary drive switches;
        a capacitor coupled between control terminals of said first and second complementary drive switches; and
        a diode coupled between a bias energy source and said capacitor, said first and second complementary switches cooperating to produce a drive signal as a function of said control signal and a level of said bias energy source.

16. The power converter as recited in claim 15 wherein a peak of said drive signal is substantially equal to said level of said bias energy source.

17. The power converter as recited in claim 15 wherein said power switch and said rectifier switch are metal-oxide semiconductor field effect transistors (MOSFETs).

18. The power converter as recited in claim 15 wherein said first and second complementary switches are embodied in a complementary metal-oxide semiconductor (CMOS) device.

19. The power converter as recited in claim 15 further comprising an inverter coupled to an input of said driver.

20. The power converter as recited in claim 15 wherein said driver further comprises a resistor interposed between said diode and said capacitor.

21. The power converter as recited in claim 15 wherein said driver further comprises a filter capacitor coupled to said bias energy source.

* * * * *